Patented May 2, 1939

2,157,010

UNITED STATES PATENT OFFICE 2,157,010

PHENYLMERCURIC GLYCOLLATE AND A PROCESS OF MAKING IT

Ralph P. Perkins, Midland, Mich., assignor to The Dow Chemical Company, Midland, Mich., a corporation of Michigan No Drawing. Original application July 31, 1933, Serial No. 683,017. Divided and this application January 31, 1936, Serial No. 61,751

5 Claims. (Cl. 260—434)

This invention concerns phenylmercuric glycollate, a new compound useful as a germicide, disinfectant, fungicide, etc., and a method of making the same.

In a copending application Serial No. 683,017, filed July 31, 1933, of which the present application is a division, I have disclosed a number of phenylmercuric salts of aliphatic hydroxycarboxylic acids, together with a method of preparing the same, and have claimed the phenylmercuric salts of aliphatic hydroxy-poly-carboxylic acids. The present application concerns the phenylmercuric salt of a hydroxy-monocarboxylic acid, specifically phenylmercuric glycollate.

Phenylmercuric glycollate may be prepared by reacting phenylmercuric hydroxide directly with glycollic acid. The phenylmercuric hydroxide may be obtained from any source, for instance from benzene by the following procedure: A mixture of mercuric oxide with more than its molecular equivalent each of benzene and of glacial acetic acid is heated to between 80° and 120° C. until a sample of the mixture is found by analysis to be substantially free of mercuric ions. The mixture is then cooled to about room temperature or lower and filtered to remove insoluble impurities, e. g., poly-acetoxymercuri-benzenes. The excess of benzene is removed from the filtrate by distillation leaving as residue a solution or mixture of phenylmercuric acetate in acetic acid. The acetic acid is preferably, although not necessarily, removed by steam distillation. The residual aqueous solution or mixture of phenylmercuric acetate is treated at between 80° and 100° C. with sufficient water-soluble hydroxide, e. g., sodium hydroxide, potassium hydroxide, barium hydroxide, etc., to convert the phenylmercuric acetate into phenylmercuric hydroxide. The latter is removed by filtration and washed with water.

In place of acetic acid other lower aliphatic acids, e. g., propionic acid, butyric acid, etc., may be employed in the above described procedure for the preparation of phenylmercuric hydroxide.

Phenylmercuric hydroxide prepared as described above or otherwise is suspended or dissolved in a substantially inert liquid, e. g., water, alcohol, etc. The resultant mixture is treated with sufficient glycollic acid to neutralize the phenylmercuric hydroxide or with an excess of the acid, if desired, the mixture preferably, although not necessarily, being stirred and heated to facilitate the neutralization. After the reaction is completed, the phenylmercuric glycollate is separated from the mixture by crystallization, by evaporation of the solvent, or otherwise, and may be purified by usual precedure. The product is obtained in excellent yield and as a nearly pure compound.

Example

To a suspension of 6 grams (0.0204 mol) of phenylmercuric hydroxide in 50 cubic centimeters of water was added 2 grams (0.0263 mol) of glycollic acid, the mixture heated on a steam bath for one hour with occasional stirring, after which it was heated under reflux for about three minutes and then cooled to room temperature to crystallize the phenylmercuric glycollate product. The latter is filtered from the mixture, washed with water, and dried. There was obtained 6.4 grams (0.0181 mol) of white crystalline phenylmercuric glycollate. The product melts at approximately 172.5°–173° C. with decomposition and has probably the formula,

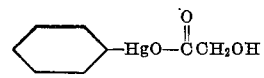

In place of phenylmercuric hydroxide, phenylmercuric carbonate or in fact any inorganic phenylmercuric base of strength sufficient to react with glycollic acid may be employed as a reactant in preparing phenylmercuric glycollate by the present method. However, I prefer to employ phenylmercuric hydroxide rather than the corresponding carbonate as a reactant since foaming usually occurs when the carbonate is used.

Other modes of applying the principle of my invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:

1. The method of making phenlymercuric glycollate which comprises reacting an inorganic phenylmercuric base with glycollic acid.

2. In a method of making phenylmercuric glycollate, the step which consists in reacting phenylmercuric hydroxide with glycollic acid.

3. In a method of making phenylmercuric glycollate, the step which consists in heating phenylmercuric hydroxide with glycollic acid to a reaction temperature in the presence of water.

4. Phenylmercuric glycollate.

5. Phenylmercuric glycollate, a crystalline compound melting at approximately 172.5°–173° C. with decomposition.

RALPH P. PERKINS.